(12) United States Patent
Ainslie et al.

(10) Patent No.: US 8,316,019 B1
(45) Date of Patent: *Nov. 20, 2012

(54) PERSONALIZED QUERY SUGGESTIONS FROM PROFILE TREES

(75) Inventors: Alex Ainslie, Princeton, NJ (US); Nan Li, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 12/822,103

(22) Filed: Jun. 23, 2010

(51) Int. Cl.
*G06F 17/30* (2006.01)

(52) U.S. Cl. ......... 707/733; 707/734; 707/784; 707/797

(58) Field of Classification Search .................. None
See application file for complete search history.

(56) References Cited

U.S. PATENT DOCUMENTS

| | | | | |
|---|---|---|---|---|
| 5,263,167 A * | 11/1993 | Conner et al. | ............ | 1/1 |
| 5,421,008 A * | 5/1995 | Banning et al. | ............ | 1/1 |
| 5,664,172 A * | 9/1997 | Antoshenkov | ............ | 707/700 |
| 5,721,900 A * | 2/1998 | Banning et al. | ............ | 1/1 |
| 5,721,901 A * | 2/1998 | Banning et al. | ............ | 1/1 |
| 5,778,363 A * | 7/1998 | Light | ............ | 1/1 |
| 5,870,737 A * | 2/1999 | Dockter et al. | ............ | 706/48 |
| 5,911,138 A * | 6/1999 | Li et al. | ............ | 1/1 |
| 6,023,697 A * | 2/2000 | Bates et al. | ............ | 1/1 |
| 6,081,814 A * | 6/2000 | Mangat et al. | ............ | 715/205 |
| 6,356,922 B1 * | 3/2002 | Schilit et al. | ............ | 715/236 |
| 6,411,950 B1 | 6/2002 | Moricz et al. | | |
| 6,453,312 B1 * | 9/2002 | Goiffon et al. | ............ | 1/1 |
| 6,523,021 B1 * | 2/2003 | Monberg et al. | ............ | 1/1 |
| 6,658,623 B1 * | 12/2003 | Schilit et al. | ............ | 715/208 |
| 6,691,106 B1 * | 2/2004 | Sathyanarayan | ............ | 1/1 |
| 6,741,983 B1 * | 5/2004 | Birdwell et al. | ............ | 1/1 |
| 6,772,150 B1 | 8/2004 | Whitman et al. | | |
| 6,829,599 B2 | 12/2004 | Chidlovskii | | |
| 6,941,524 B2 * | 9/2005 | Lee et al. | ............ | 715/854 |
| 6,947,930 B2 | 9/2005 | Anick et al. | | |
| 7,113,944 B2 | 9/2006 | Zhang et al. | | |
| 7,266,545 B2 * | 9/2007 | Bergman et al. | ............ | 707/706 |
| 7,272,612 B2 * | 9/2007 | Birdwell et al. | ............ | 1/1 |
| 7,565,627 B2 * | 7/2009 | Brill et al. | ............ | 715/854 |
| 7,716,229 B1 * | 5/2010 | Srivastava et al. | ............ | 707/749 |

(Continued)

OTHER PUBLICATIONS

Chirita, Paul A., et al., "Personalized Query Expansion for the Web," Jul. 23-27, 2007, ACM SIGIR '07, pp. 7-14.*

(Continued)

*Primary Examiner* — Farhan Syed
(74) *Attorney, Agent, or Firm* — Fish & Richardson P.C.

(57) ABSTRACT

Methods, systems, and apparatus, including computer program products, for personalized query suggestion are disclosed. The personalized query suggestion utilizes a personalized profile tree constructed using search history associated with a user. The personalized profile tree is a hierarchy of nodes representing categories of information that the user has previously searched or selected from search results. When a search query is received from the user, a ranked list of related queries can be generated for the received search query. Each of the related queries is compared against the nodes in the personalized profile tree, and a relevance score is given to the related query based on the depth of a matching node in the tree, and a child count for the matching node. The related queries are re-ranked based on their respective relevance scores. After the re-ranking, top-ranked related queries are presented to the user as query suggestions.

18 Claims, 4 Drawing Sheets

U.S. PATENT DOCUMENTS

| | | | | |
|---|---|---|---|---|
| 7,743,044 | B1* | 6/2010 | Kalogeraki et al. | 707/706 |
| 7,756,864 | B2* | 7/2010 | Chandrasekar et al. | 707/722 |
| 7,765,178 | B1* | 7/2010 | Roizen et al. | 1/1 |
| 7,822,774 | B2* | 10/2010 | Craswell et al. | 707/791 |
| 7,890,526 | B1* | 2/2011 | Brewer et al. | 707/767 |
| 7,991,769 | B2* | 8/2011 | Fontoura et al. | 707/719 |
| 2003/0126235 | A1* | 7/2003 | Chandrasekar et al. | 709/220 |
| 2003/0218639 | A1* | 11/2003 | Lee et al. | 345/853 |
| 2004/0186846 | A1* | 9/2004 | Birdwell et al. | 707/101 |
| 2004/0186920 | A1* | 9/2004 | Birdwell et al. | 710/1 |
| 2006/0064432 | A1* | 3/2006 | Pettovello | 707/103 X |
| 2006/0074891 | A1* | 4/2006 | Chandrasekar et al. | 707/3 |
| 2006/0277309 | A1* | 12/2006 | Eaton | 709/227 |
| 2007/0094245 | A1* | 4/2007 | Vigil | 707/4 |
| 2007/0136247 | A1* | 6/2007 | Vigil | 707/3 |
| 2007/0174309 | A1* | 7/2007 | Pettovello | 707/100 |
| 2007/0185831 | A1* | 8/2007 | Churcher | 707/3 |
| 2007/0255748 | A1* | 11/2007 | Ferragina et al. | 707/102 |
| 2008/0010253 | A1 | 1/2008 | Sidhu et al. | |
| 2008/0109461 | A1* | 5/2008 | Birdwell et al. | 707/100 |
| 2008/0306934 | A1* | 12/2008 | Craswell et al. | 707/5 |
| 2009/0019002 | A1* | 1/2009 | Boulis | 707/3 |
| 2009/0055361 | A1* | 2/2009 | Birdwell et al. | 707/3 |
| 2009/0198644 | A1* | 8/2009 | Buchner et al. | 707/2 |
| 2010/0085893 | A1* | 4/2010 | Kim et al. | 370/254 |
| 2011/0016115 | A1* | 1/2011 | Craswell et al. | 707/726 |
| 2011/0225155 | A1* | 9/2011 | Roulland et al. | 707/737 |
| 2011/0289460 | A1* | 11/2011 | Dow et al. | 715/854 |
| 2011/0320498 | A1* | 12/2011 | Flor | 707/797 |
| 2012/0023055 | A1* | 1/2012 | Dagaeff | 706/47 |

OTHER PUBLICATIONS

R. R Baeza-Yates, C. Hurtado, and M. Mendoza, "Query Recommendation Using Query logs in Search Engines," Nov. 2004, Lecture Notes in Computer Science, Springer Berlin/Heidelberg, pp. 588-596.*

M. Barouni-Ebrahimi and A.A. Ghorbani, "A Novel Approach for Frequent Phrase Mining in Web Search Engine Query Streams," CNSR '07: Proceedings of the 5th Annual Conference on Communication Network and Services Research, pp. 125-132, 2007.*

P. Boldi, F. Bonchi, C. Castillo, et al., "Query Suggestion using Query-Flow Graphs," WSCD '09: Proceedings of the 2009 Workshop on Web Search Click Data, pp. 56-63, 2009.*

H. Cao, D. Jiang, et al., Context-aware query suggestion by mining click-through and session data, KDD '08, pp. 875-883, 2008.*

S. Cucerzan and R.W. White, "Query Suggestion Based on User Landing Pages, SIGIR '07: Proceedings of the 30th Annual International ACM SIGIR Conference on Research and Development in Information Retrieval," pp. 875-876, 2007.*

Q. Mei, D. Zhou, and K. Church, "Query Suggestion Using Hitting Time," CIKM '08: Proceedings of the 17th ACM Conference on Information and Knowledge Management, pp. 469-478, 2008.*

Bhatia, Sumit, et al., "Query Suggestions in the Absence of Query Logs," Jul. 24-28, 2011, Beijing, China, SIGIR '11, pp. 1-10.*

Rocha, Marcelo Gabriel Mendoza, "Query Log Mining in Search Engines," 2007, University of Chile, Computer Science, Ph.D. Thesis, pp. 1-138.*

Bar-Youssef, Ziv and Gurevich, Maxim, "Mining Search Engine Query Logs via Suggestion Sampling," Aug. 23-28, 2008, PVLDB '08, pp. 54-65.*

Zhang, Zhiyong, et al., "Mining Search Engine Query Logs for Query Recommendation," May 22-26, 2006, WWW '06, pp. 1039-1040.*

* cited by examiner

PERSONALIZED QUERY SUGGESTIONS FROM PROFILE TREES

BACKGROUND

This specification relates generally to query refinement.

The Internet provides access to a wide variety of resources, for example, video files, image files, audio files, or Web pages including content for particular subjects, book articles, or news articles. A search system can select one or more resources in response to receiving a search query. A search query is data that a user submits to a search engine to satisfy the user's informational needs. The search queries are usually in the form of text, e.g., one or more query terms. The search system selects and scores resources based on their relevance to the search query and on their importance relative to other resources to provide search results that link to the selected resources. The search results are typically ordered according to the scores and presented according to this order.

Some search engines also provide a list of query suggestions along with the result listing for the original search query submitted by the user. The query suggestions are queries that are related to the original search query in terms of the subject matter that they represent. For example, each query suggestion may share one or more search terms with the original search query or belong to the same topical category as the original search query. Query suggestions can help the user focus their search toward one of several possible directions or find better expressions of the information he or she is interested in. Typically, the search engines rank the related search queries based on a number of factors and only a small set of top-ranked related queries are presented to the user as query suggestions.

For example, query suggestions for an original query submitted by a user can be derived from query logs of a multitude of users. Typically, search queries related to the original query are identified in the query logs based on one or more shared search terms in the original query and the related queries. The related queries are ranked based at least in part on their frequencies of occurrence in the query logs. Consequently, only the most popular queries are likely to be presented to the user as query suggestions. Sometimes, these query suggestions may not accurately reflect the specific interests of the user submitting the original search query.

SUMMARY

This specification describes technologies relating to query refinement, through personalized query suggestion.

In one aspect, a method includes the actions of: receiving a search query, the search query associated with a user identifier; receiving a ranked list of related search queries for the received search query, the related search queries being suggested alternate queries for the search query and ranked according to a first order; and accessing a profile tree associated with the user identifier and including a hierarchy of nodes, the hierarchy of nodes including a root node and a plurality of child nodes, each child node descending from the root node or another child node, the profile tree defining a plurality of levels, each level including child nodes that descend from the root node at a same depth, and each node of the profile tree representing a respective topic that is derived from search history data associated with the user identifier. The method further includes, for each of the related search queries, identifying in the profile tree one or more nodes that match the related search query; determining the respective levels of the one or more nodes that match the related search query; and deriving a respective relevance score for the related search query based on the respective levels of the one or more nodes that match the related search query. The method further includes the actions of: adjusting the rank of at least one of the related search queries in the list based on the respective relevance scores of the related search queries so that the search queries are ranked according to a second order different from the first order; and providing suggested query data to a client device associated with the user identifier, the suggested query data operable to cause the client device to present a plurality of top-ranked related search queries according to the second order.

Other embodiments of this aspect include corresponding systems, apparatus, and computer programs, configured to perform the actions of the methods, encoded on computer storage devices.

These and other embodiments can each optionally include one or more of the following features.

In some implementations, the ranked list of related search queries are based on search queries previously submitted by a plurality of users.

In some implementations, relevance associated with a node increases with increasing depth of a respective level associated with the node in the profile tree.

In some implementations, the method further includes, for each of the related search queries, obtaining a respective child count for each of the one or more nodes that match the related search query; where the relevance score for the related search query is derived based on both the respective child counts and the respective levels of the one or more nodes that match the related search query.

In some implementations, relevance associated with a node decreases with an increasing child count for the node in the profile tree.

In some implementations, each node of the profile tree includes search terms and phrases previously entered by a user in association with the user identifier and the search terms and phrases in the profile tree are distributed among the nodes of the profile tree according to the respective topics to which the search terms and phrases belong.

In some implementations, the one or more nodes that match the related search query are the nodes that explicitly include at least one search term of the related search query.

In some implementations, the each node of the profile tree includes terms and phrases extracted from result documents that have been previously selected by a user during search sessions associated with the user identifier, and the terms and phrases included in the profile tree are distributed among the nodes of the profile tree according to the respective topics to which the search terms and phrases belong.

In some implementations, for each of the related search queries, the one or more nodes that match the related search query each represents a respective topical category that includes a concept represented by terms of the related search query.

Particular embodiments of the subject matter described in this specification can be implemented to realize one or more of the following advantages.

A search engine can utilize a tree-structured personal profile associated with the user to identify a subset of the related queries that are more likely to reflect the user's interests and to provide a boost to these related queries so that they are more likely to appear in the list of query suggestions presented to the user. By personalizing the query suggestions, the search engine can serve the user in better expressing the user's specific search needs.

The tree-structured personal profile is a hierarchy of nodes representing topics and categories of information that may be of interest to the user. The tree-structured personal profile can be built based on the user's prior search history and/or web browsing history. Each search term or phrase in a related query of the original query can be compared against nodes in the personal profile tree, and the personal relevance of the search term or phrase can be evaluated based on the depths and child counts of certain nodes in the profile tree that match the search term. A related query that contains personally relevant search terms can be boosted in rank in the list of related queries and become more likely to be presented to the user as query suggestions. The specific structure and comprehensiveness of the profile tree associated with the user can be varied and improved over time without affecting the process for query suggestion. Therefore, the system and method for personalized query suggestion disclosed herein are modular and scalable.

The details of one or more embodiments of the subject matter described in this specification are set forth in the accompanying drawings and the description below. Other features and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes personalized query suggestion based on a personal profile tree.

Example Information Retrieval System

Figure 1:
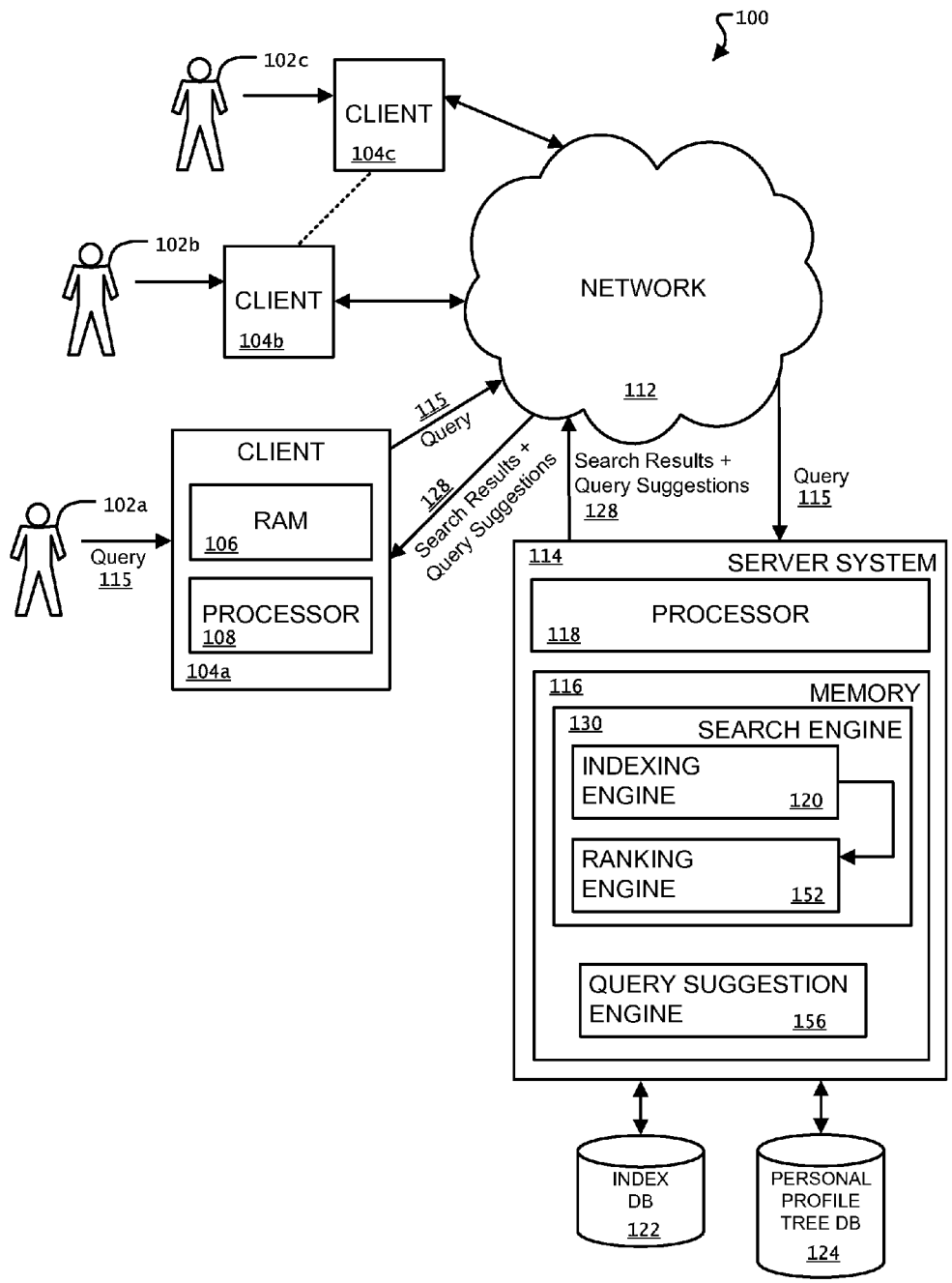
FIG. 1 is a block diagram of an example environment in which an information retrieval system is implemented.

FIG. 1 is a block diagram of an example environment 100 in which an information retrieval system is implemented. The environment 100 can be implemented in an Internet, intranet, or other client/server environment. A server system 114 generates search results in response to search queries submitted by users (e.g., 102a-c using client devices 104a-c). Although several components are illustrated, there may be fewer or more components in the environment 100. Moreover, the components can be distributed on one or more computing devices connected by one or more networks or other suitable communication mediums.

In the example environment 100, a user (e.g., 102a) can interact with the server system 114 through a client device (e.g., 104a) or other device. The client device 104a can be a computer terminal within a local area network (LAN) or wide area network (WAN). The client device 104a includes a random access memory (RAM) 106 (or other memory and/or storage device) and a processor 108. The processor 108 is structured to process instructions within the client device 104a. In some implementations, the processor 108 is structured to process instructions stored in the RAM 106 (or other memory and/or storage device included with the client device 104a) to display graphical information for a user interface.

The user 102a can connect to a search engine 130 within the server system 114 to submit a search query 115. The user 102a submits the search query 115 through an input device attached to the client device 104a. The query 115 is sent into a network 112 and is forwarded to the server system 114. The server system 114 can be one or more server devices in one or more locations. A server device of the server system 114 can include a memory device 116 having the search engine 130 loaded therein. The server device can also include one or more processors 118. The processor 118 processes instructions stored in the memory device 116 that are related to the search engine 130 and sends information to the client device 104a, through the network 112, to create a graphical representation of search results in a user interface of the client device 104a (e.g., search results webpage displayed in a web browser).

When the client device 104a transmits the search query 115 to the server system 114, the query 115 can be accompanied by a user identifier associated with the client device 104a. The user identifier can be a username associated a user account registered at the server system 114, a network address of the client device 104a, a device identifier for the client device 104a, a digital signature of the user 102a, and so on. In some implementations, the server system 114 can gather information from multiple sources to correlate different types of identifying information associated with the user 102a and/or the client device 104a, such that any of the identifying information can be used as the user identifier for the user 102a and/or the client device 104a.

In some implementations, to protect the privacy of users, the server system 114 anonymizes the historical data for the user so that the user's search history data cannot be associated with the user. However, if the user opts-in for tracking of the user history data, the sever system 114 can associate search queries and clicks with the user identifier that is uniquely associated with the user. The server system 114 can optionally associate other data with the user identifier, such as a navigational history of user sessions associated with the user identifier, bookmarks associated with the user identifier, and subscribed feeds associated with the user identifier. At the user's option, the server system 114 can be configured to track only data approved by the user, such as only search queries and search result selections. The user can clear all history data associated with the user's identifier account at any time, and can opt-out of such tracking at any time.

After the search query 115 and the accompanying user identifier are received by the search engine 130, the search engine 130 uses the information within the query 115 (e.g., search terms) to find relevant documents. The search engine 130 includes an indexing engine 120 that actively searches a corpus (e.g., webpages on the Internet) to index the documents found in that corpus. The index information for the documents in the corpus is stored in an index database 122. This index database 122 is accessed to identify documents related to the user query 115. Note that, an electronic document (which for brevity will simply be referred to as a document) does not necessarily corresponds to a file. A document can be stored in a portion of a file that holds other documents, in a single file dedicated to the document in question, or in multiple coordinated files. Moreover, a document can be stored in a memory without having first been stored in a file.

The search engine 130 includes a ranking engine 152 to rank the documents responsive to the user query 115. The ranking of the documents can be performed using techniques for determining an information retrieval score for indexed documents in view of a given query. The information retrieval score of a document is based, in part, on the relevance of the document in light of the search terms included in the search query. The relevance of a particular document with respect to a particular search term or to other provided information can be determined by various techniques. For example, the number of occurrences and locations of the search term in a document may be used to infer the document's relevance score with respect to the search term. When multiple search terms are present in the search query, the relevance of the document with respect to the entire query can be based on a combination of the document's relevance scores with respect to all search terms in the query, with the exception of certain stop words (e.g., "a," "the," "is," "to," etc.) included in the query. Other factors that influence the information retrieval score of the document include, for example, the quality of the document, the authority (e.g., as reflected by general level of back-links to the document), general user-feedback related to the document (e.g., as reflected by the click-through rate of the document when it was presented as a search result), and so on.

In some implementations, server system 114 includes a query suggestion engine 156. The query suggestion engine 156 can identify a list of related queries for the original query submitted by the user. The related queries can be identified from logs of queries previously submitted by a multitude of users. In some implementations, each of the related queries includes at least one common search term as the original query 115 submitted by the user 102a. Each of the related queries may be a more specific variant of the original query 115 or an alternative expression of the concept represented by the original query 115. Various techniques can be used by the query suggestion engine 156 to identify and rank the related queries for the original query 115. For example, a clustering algorithm can be used to find related queries and provide a measure of relatedness between search queries.

The query suggestion engine 156 can score and rank the identified related queries based on various factors, such as the similarity and relatedness between a related query and the original query, a related query's frequency of occurrence in the query logs, the geographic relevance of a related query to the geographic region associated with the user, the demographic relevance of a related query to the demographic information known about the user, and so on.

Once the result documents and the top-ranking related queries are identified and scored, the server system 114 forwards the final, ranked result list 128 through the network 112. The final, ranked result list 128 can be accompanied by the top-ranking related queries. Exiting the network 112, the ranked result list 128 and the top-ranked related queries are received by the client device 104a where the search results and the top-ranked related queries are stored in the RAM 106 and/or used by the processor 108 to display the results and the top-ranking related queries on an output device for the user 102a. The top-ranking related queries can be presented as query suggestions that the user 102a can select to perform a new search that better expresses the user's information needs.

In some implementations, the query suggestion engine 156 can utilize the information stored in a personal profile tree database 124 to boost the ranking of some related queries of an original query that are more relevant to each user's specific interests. The personal profile tree database 124 includes respective personal profile trees of multiple users, where each personal profile tree is associated with a particular user identifier and built according to the search history and/or web browsing history associated with the particular user identifier.

When the search engine 130 receives a search query and its associated user identifier, the query suggestion engine 156 can identify and rank multiple related queries based on various factors such as query popularity, similarity to the original query, and so on. In some implementations, the query suggestion engine 156 or a component of the query suggestion engine 156 can take the initially ranked list of related queries and re-rank them using the information derived from the personal profile tree associated with the same user identifier. Each related query can be given a personalized relevance score based on the personal profile tree. The ranking of some related queries are boosted due to their higher personalized relevance scores. As described herein, the query suggestions presented to the user reflect the individualized interests of the particular user submitting the search query. In some implementations, instead of being used in re-ranking the related queries, the personalized relevance scores of the related queries can be used among several factors in generating an initial ranking of the related queries.

Personal Profile Tree

Figure 2:
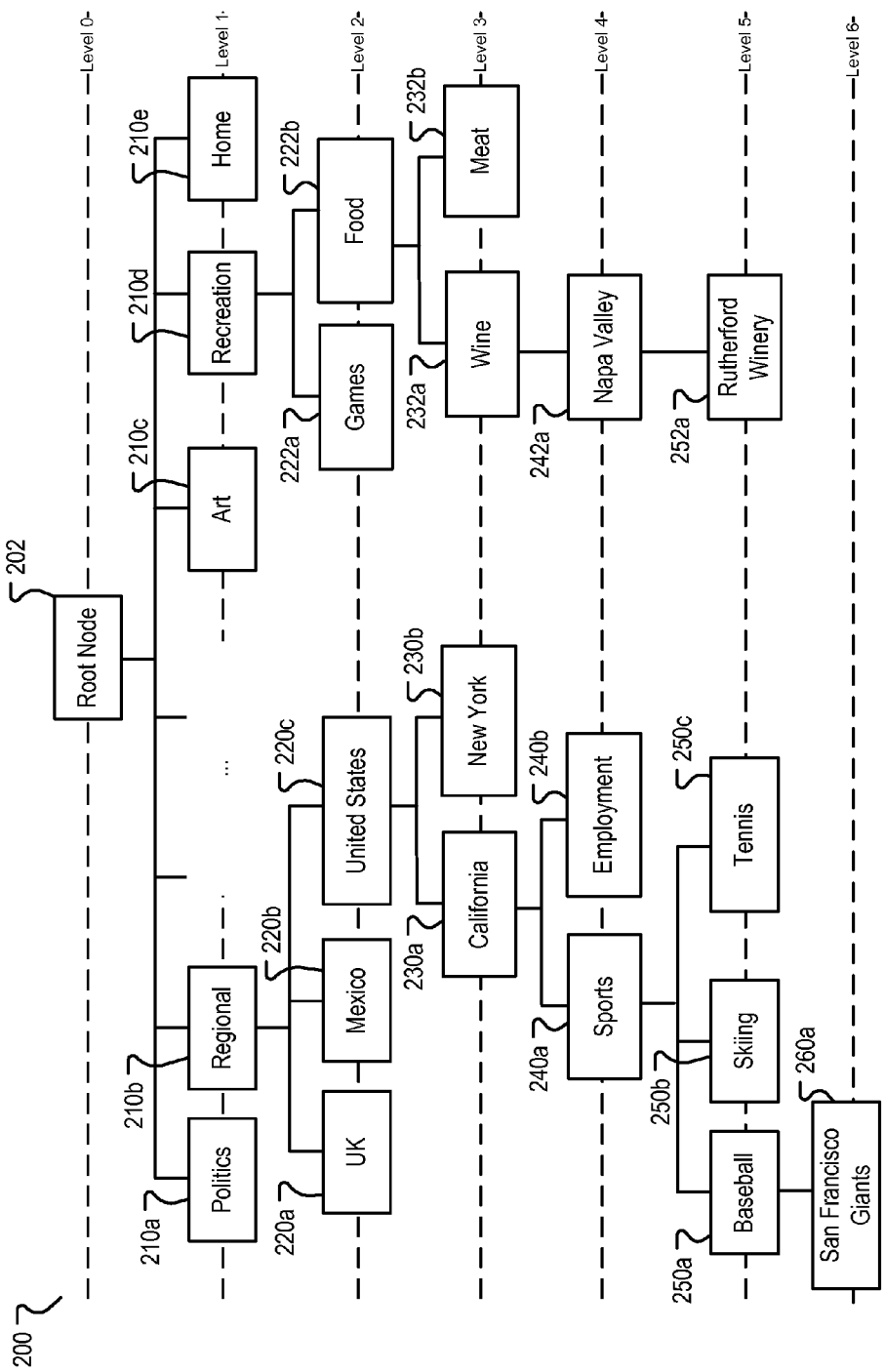
FIG. 2 is a block diagram of an example personal profile tree.

FIG. 2 illustrates an example personal profile tree 200 associated with a user identifier. The example personal profile tree 200 is a hierarchy of nodes representing various topics and categories of information that may be of interest to the user associated with the user identifier. The hierarchy of nodes includes a root node 202 and a number of child nodes (e.g., nodes 210a-e, 220a-c, 222a-b, 230a-b, 232a-b, 240a-b, 242a, a50a-c 252a, and 260a). Each child node descends from either the root node 202 or another child node. For example, child nodes 210a-e descends directly from root node 202; and child nodes 220a-c descends directly from child node 210b.

The profile tree 200 defines a number of levels (e.g., levels 0 through 6 shown in FIG. 2), where each level includes child nodes that descend from the root node 202 at the same depth. For example, child nodes 210a-c are located on level 1 of the profile tree 200, child nodes 220a-c and 222a-b are located on level 2 of the profile tree 200, child nodes 230a-b and 232a-b are located on level 3 of the profile tree 200, and so on. In some implementations, the depth of a child node in the profile tree can be equal to the number of ancestor nodes from which the child node descends. For example, the child node 260a is located on level 6 of the profile tree 200, and child node 260a has six ancestor nodes (e.g., the child nodes 250a, 240a, 230a, 220c, 210b, and the root node 202) from which the child node 260a descend.

Each node in the profile tree 200 may have no child node, one child node, or multiple children nodes directly descending from it. If a child node has no descendents, then it can be called a leaf node. For each node in the profile tree, a count of child nodes (or child count) is equal to the number of child nodes descending directly from the node. For example, the child node 210b has three child nodes (e.g., child nodes 220a-c) descending directly from it, and therefore a child count of three, while the child node 260a has no child node descending directly from it, and therefore a child count of zero.

In some implementations, instead of defining the child count to equal to only the number of child nodes descending directly from a node, the child count of a node can be defined as a count of all child nodes descending the node, regardless of whether they do so directly or indirectly. For example, in these implementations, the child node 210d has a child count of 6.

Each node in the profile tree 200 associated with a user identifier represents a topic or information category that may be of interest to a user associated with the user identifier. The hierarchy of nodes in the profile tree 200 represents increasingly specific topics and information categories as the tree is descended. In general, the specificity of the topic or information category represented by a node increases with an increasing depth of the node in the profile tree 200. Similarly, the specificity of the topic or information category represented by a node decreases with an increasing child count for the node in the profile tree 200.

In general, if two topics or information categories both appear in a user's personal profile tree, the more specific topic or information category is considered more personally relevant to the user than the more general topic or information category. In other words, if two nodes appear in a user's personal profile tree, the topic represented by the node at a deeper level of the profile tree is considered more personally relevant to the user than the topic represented by the node at a shallower level of the profile tree. Similarly, if two nodes appear in a user's personal profile tree, the topic represented by the node with a higher child count is considered less personally relevant than the topic represented by the node with a lower child count.

The profile tree 200 associated with a user identifier can be constructed according to various information known to be of interest to the user associated with the user identifier. In some implementations, the personal profile tree 200 can be constructed using the search history that is associated with the user identifier.

For example, each node in the profile tree 200 can represent a topic or information category in which the user has searched before. In some cases, a node in the profile tree 200 can include a single search term that the user has previously submitted in a search query. In a simplified example, suppose the user has previously submitted a query "San Francisco Giants," which is the name of a major league baseball team in San Francisco, a child node (e.g., child node 260a) including this very specific search phrase can be inserted in the personal profile tree 200 of the user as a leaf node.

In addition, a number of more general topics can be derived from this very specific search query (e.g., "San Francisco Giants"), and each of these topics can form the ancestor nodes (e.g., child nodes 210b, 220c, 230a, 240a, and 250a) above the child node (e.g., 260a) corresponding to this very specific search query. In this simplified example, the ancestor nodes correspond to a hierarchy of topics with increasing specificity, including "Regional," "United States," "California," "Sports," and "Baseball." Sometimes, if one or more ancestor nodes already exist in the profile tree 200, only the new child nodes are added to the profile tree, and under their appropriate ancestor nodes. Otherwise, if the query "San Francisco Giants" is the first query that is used to build the profile tree for the user, then the tree is instantiated with the ancestor nodes 202, 210b, 220c, 230a, 240a, 250a, and 260a.

In some implementations, once a node is added to the personal profile tree 200, a collection of terms and phrases that describe the particular topic or category of information represented by the node can be included in the node. In some cases, the collection of terms and phrases include previously entered search terms that belong to the broad topic or information category represented by the node. For example, if the user has previously entered a search query "ski resorts in California," the search term such as "ski," can be included in the nodes representing "skiing," "sports," "California," "United States," and "Regional" as well. In some cases, terms and phrases not having been searched by the user but nonetheless belong to the broad category represented by the node can also be added to the node.

In some implementations, terms and phrases extracted from result documents that have been previously selected by the user can be also used to construct the personal profile tree 200. The extracted terms and phrases tree can be used to generate new nodes in the profile tree and/or distributed among the new and existing nodes in the profile tree according to the respective topics to which the terms and phrases belong.

In some implementations, the web browsing history associated with the user identifier of the user can also be used to construct the personal profile tree associated with the user identifier. Terms and phrases extracted from documents viewed by the user in association with the user identifier can be used to generate new nodes in the profile tree and/or distributed among the new and existing nodes in the profile tree according to the respective topics to which the terms and phrases belong.

In some implementations, other information reflecting the user's interests can be used to construct or to supplement the construction of the personal profile tree associated with the user's user identifier. As additional information (e.g., search history and web browsing history) accumulates over time, the profile tree can be updated with the additional information. As personal profile tree develops over time, clusters of nodes representing the user's specific areas of interests will emerge.

Personalized Query Suggestion

Figure 3:
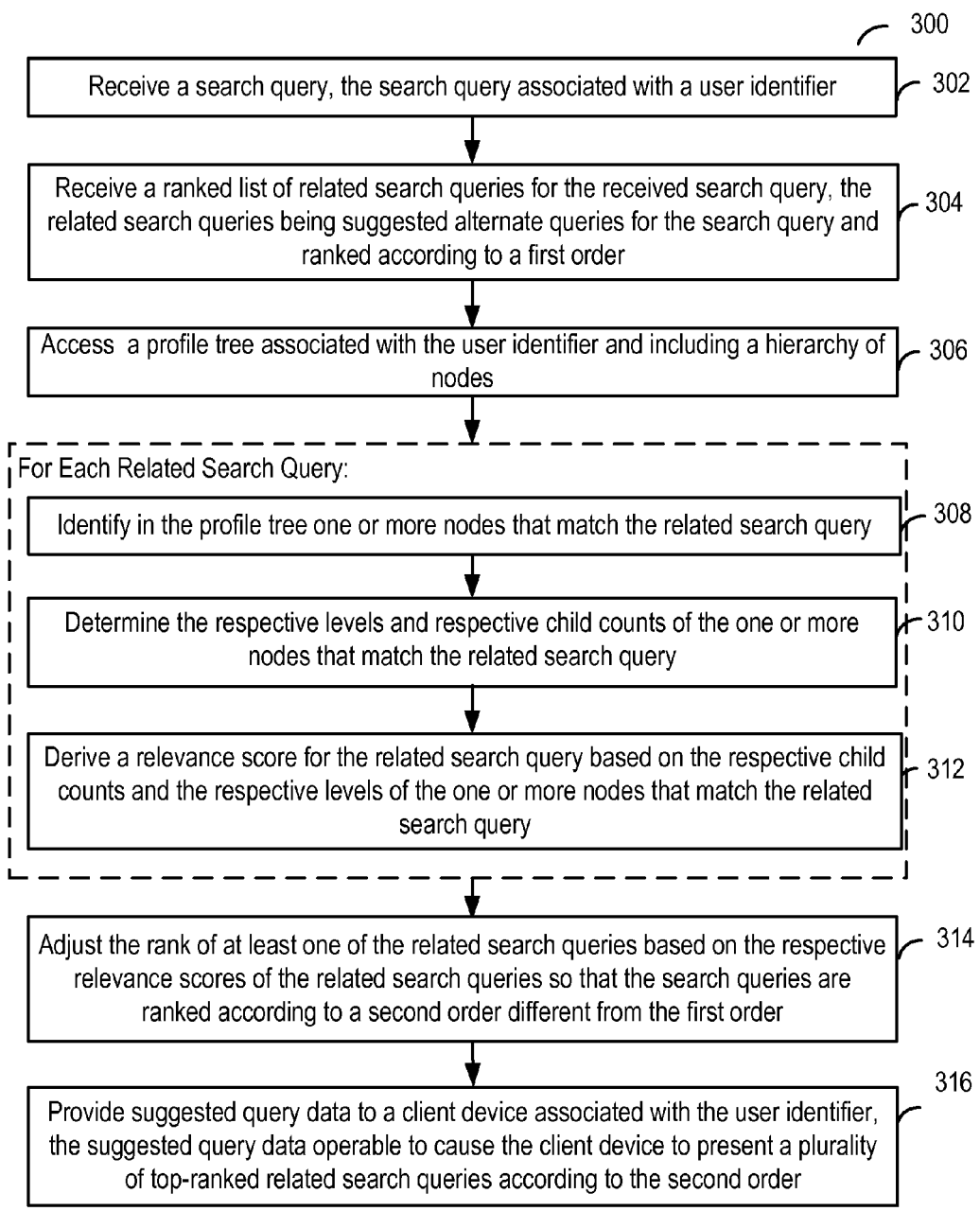
FIG. 3 is a flow diagram of an example process for providing personalized query suggestions using a personal profile tree.

FIG. 3 is a flow diagram of an example process 300 for providing personalized query suggestion using a personal profile tree. The example process 300 can be implemented by one or more components of the search engine 130 shown in FIG. 1, such as the query suggestion engine 156.

The example process 300 starts when a search query is received (302), where the search query is associated with a user identifier. In some implementations, the search query can be submitted in association with the user identifier through an interface provided by a search engine. The user identifier can be a username associated with a user, an IP address associated with a client device of the user, a device identifier, and so on.

After the search query is received, a ranked list of related search queries for the received search query can be received (304), where the related search queries are suggested alternate queries for the search query and are ranked according to a first order. In some implementations, the list of related search queries can be derived from query logs of a multitude of users, and ranked according to their relative popularity and relatedness to the received search query. In some implementations, each of the list of related search queries includes at least one common search term as the received search query. For example, if the received search query contains a single search term "cookies," the list of related search queries may include "baking cookies," "delete cookies," "computer cookies," "gourmet cookies," "chocolate chip cookies," "pictures of cookies," "cookie recipes," "cookie gifts," and so on. Each of these alternate queries can represent a refinement of the original search query "cookies" because the alternate query narrows or clarifies the original search query in a particular aspect.

In some implementations, the ranked list of related search queries for the received search query is dynamically generated by one component or process of a search engine, and provided to another component or process of the search engine for re-ranking. In some implementations, the ranked list of related search queries for the received search query is retrieved from a database based on the received search query. Various processes and components for generating the original ranked list of related search queries for the received are possible.

After the ranked list of related search queries has been received, a profile tree associated with the user identifier is accessed (306). In various implementations, the profile tree associated with the user identifier includes a hierarchy of nodes and the hierarchy of nodes includes a root node and a plurality of child nodes. Each child node descends from the root node or another child node. In addition, the profile tree defines a plurality of levels, each level including child nodes that descend from the root node at a same depth. Each node of the profile tree represents a respective topic that is derived from search history data associated with the user identifier.

In some implementations, each node of the profile tree includes search terms and phrases previously entered by a user in association with the user identifier, and the search terms and phrases included in the profile tree are distributed among the nodes of the profile tree according to the respective topics to which the search terms and phrases belong. In some implementations, each node of the profile tree includes terms and phrases extracted from result documents that have been previously selected by a user in association with the user identifier, and the terms and phrases included in the profile tree are distributed among the nodes in the profile tree according to the respective topics to which the terms and phrases belong.

An example of the profile tree is illustrated and described with respect to FIG. 2.

In some implementations, the profile tree associated with the user identifier is stored in a database, and the search engine 130 queries the database to retrieve the profile tree based on the user identifier.

For each of the related search queries, a personal relevance score can be derived based on the information stored in the profile tree. To derive the personal relevance score, one or more nodes that match the related search query can be identified in the profile tree (308). In some implementations, a node is deemed to match the related search query if the node explicitly includes one or more search terms of the related search query. For example, if a user has previously searched computer related terms (e.g., computer languages, network protocols, etc.), it is likely that the user's profile tree includes a node "computer," and the node "computer" explicitly includes the search term "computer." The "computer" node would match the related search query "computer cookies" because the "computer" node explicitly includes the term "computer" in the related search query "computer cookies."

In some implementations, a node is deemed to match the related search query if the node represents a topical category that includes a concept represented by the one or more search terms of the related search query. For example, the node "cooking" would match the search term "recipes" because the "cooking" category includes a subcategory such as "recipes." Therefore, the node "cooking" would match the related search query "cookie recipes." Other methods of matching a related search query against nodes in the profile tree are possible. In some implementations, a match between a related search query and a node can be declared if one or more search terms of the related search query represent a concept that belongs to the topical category represented by the node, regardless of whether the user has previously entered the search terms or whether the node explicitly includes the search terms. In some implementations, a related search query may find multiple matching nodes in the profile tree. These matching nodes can belong to a single branch of the profile tree or several different branches of the profile tree.

After the matching nodes of a related search query have been identified, the respective levels and/or respective child counts of the one or more nodes that match the related search query can be determined (310). Then, for each related search query, a respective relevance score can be derived for the related search query based on the respective levels and/or child counts of the one or more nodes that match the related search query (312).

In some implementations, the levels are determined by querying an independent module with the search terms of the related search query as input, where the independent module searches the tree-structured profile and returns the matching nodes for the search terms and their respective levels in the profile tree. In some implementations, the determination is done by searching the tree-structured profile directly to locate the matching nodes and find out their respective levels in the profile tree.

Various scoring functions can be used to relate the relevance score and the respective levels of the matching nodes in the profile tree. For example, the relevance score can be directly proportional to the level of the lowest matching node (e.g., the matching node having the largest depth) in the profile tree, and asymptotically approaches a maximum value as the number of matching nodes increases. Other ways of combining the levels of the matching nodes are possible. In general, the personal relevance of a related search query associated with a matching node increases with increasing depth of the level associated with the node in the profile tree. And in general, the personal relevance of a related search query increases as the number of matching nodes for the related search query increases.

In addition, various scoring functions can be used to relate the personalized relevance score and the respective child counts of the matching nodes in the profile tree. For example, the personalized relevance score can be inversely proportional to the child counts the lowest matching node (e.g., the matching node having the largest depth) found in different branches of the profile tree. In general, the personal relevance of a related search query associated with a matching node decreases with increasing child counts associated with the node in the profile tree.

In some implementations, in addition to the individual terms in the related search query, one or more search phrases including two or more consecutive search terms (e.g., bi-grams, tri-grams, or other n-grams) can be generated from the related search query. The search phrases can be matched against the nodes in the profile tree, and respective relevance scores for the related search query can be derived based on the matching nodes of the search phrases as well. As with individual search terms, for each of the search phrases generated from the search query, one or more nodes that match the search phrase can be identified in the profile tree. The respective levels and respective child counts of the one or more nodes that match the search phrases can be determined, and the personalized relevance score for the related search query can be derived based on the respective levels and/or the respective counts of child nodes for the one or more nodes that match the search phrases as well. In some implementations, the matching nodes for the search phrases are given more weight than the matching nodes for individual search terms in the related search query.

In some implementations, the rank of at least one of the related search queries in the list is adjusted based on the respective relevance scores of the related search queries so that the search queries are ranked according to a second order different from the first order (314). In some implementations, suggested query data is provided to a client device associated with the user identifier (316), where the suggested query data is operable to cause the client device to present a plurality of top-ranked related search queries according to the second order. In some implementations, the search engine provides the top-ranked related search query as query suggestions that the user can select to perform a new search that better expresses his or her information needs.

Computing Devices

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 4:
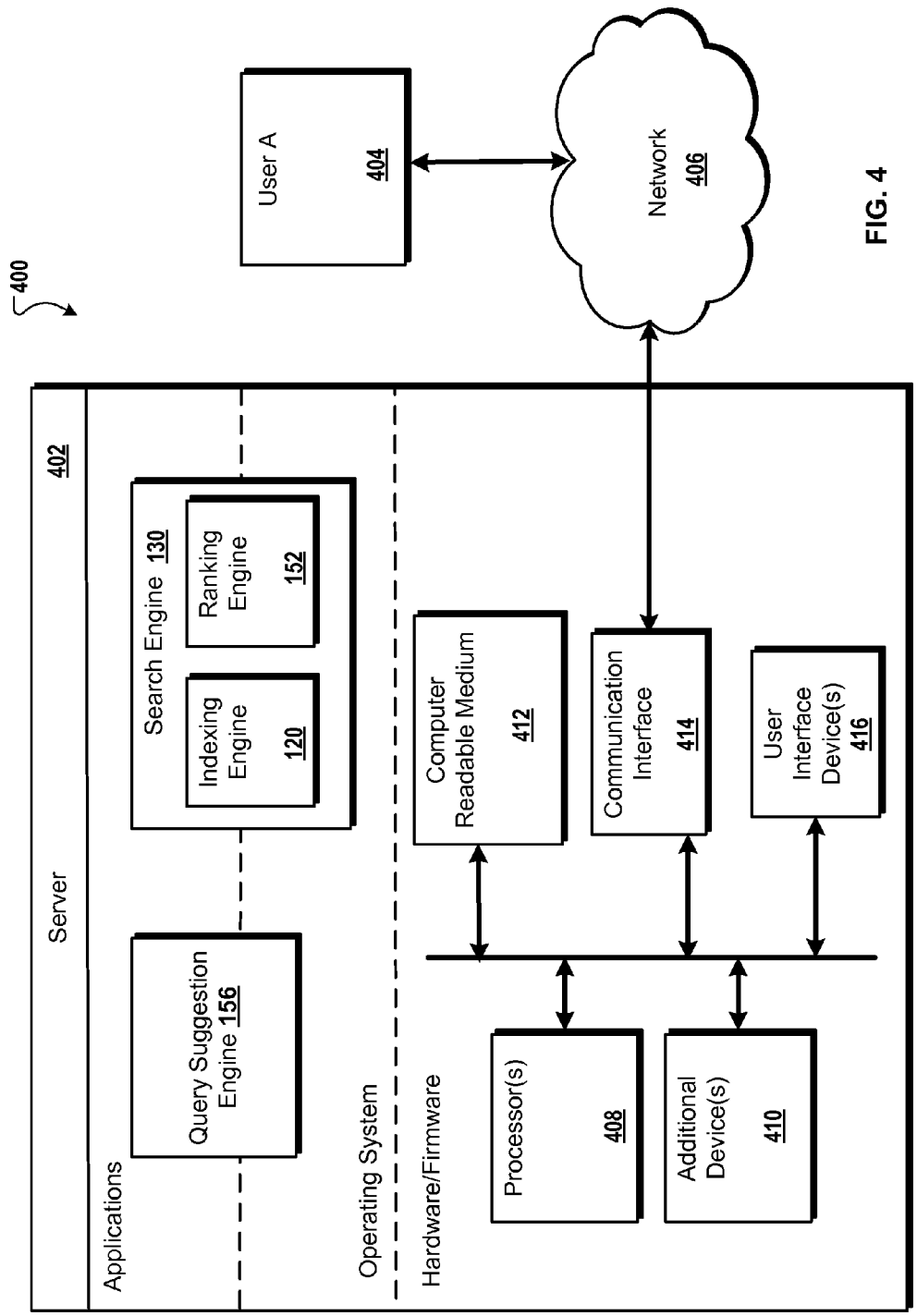
FIG. 4 is a block diagram of an example operating environment for an example computing system.

FIG. 4 shows a block diagram of a environment 400 suitable for implementing apparatus or performing methods of various aspects of the subject matter described in this specification. The environment 400 consists of a server 402 communicating with one or more user computers such as user computer A 404. The server 402 and user computers 404 are connected through a network 406.

The server 402 consists of one or more data processing apparatus. While only one data processing apparatus is shown in FIG. 4, multiple data processing apparatus can be used. The server includes various modules, e.g. executable software programs, including a query suggestion engine 156 and a search engine 130. Each module runs as part of the operating system on the server, runs as an application on the server, or runs as part of the operating system and part of an application on the server.

The optional search engine 130 includes an indexing engine 120 and a ranking engine 152. The search engine 130 generates search results responsive to queries, for example, as described above with reference to FIG. 1. The query suggestion engine 152 generates query suggestions, for example, as described with reference to FIGS. 1-3. The server system 402 then presents the query suggestions to a user along with search results responsive to the query.

The server 402 can also have hardware or firmware devices including one or more processors 408, one or more additional devices 410, a computer readable medium 412, a communication interface 414, and one or more user interface devices 416. Each processor 408 is capable of processing instructions for execution within the server 402. Each processor 408 is capable of processing instructions stored on the computer readable medium 412 or on a storage device (e.g., an additional device 410). The server 402 uses its communication interface 414 to communicate with one or more computers, for example, over a network. Examples of user interface devices 416 include a display, a camera, a speaker, a microphone, a tactile feedback device, a keyboard, and a mouse.

The server 402 can store instructions that implement operations associated with the modules described above, for example, on the computer readable medium 412 or one or more additional devices 410, for example, one or more of a floppy disk device, a hard disk device, an optical disk device, or a tape device. In some implementations, the data processing apparatus 402 also stores additional data, for example, user preference data, person profile tree data, or other data, on the computer readable medium 412 or one or more additional devices 410.

User computers such as user computer A 404 are connected to the server 402 through the network 406. Users submit search queries to the server 402 and select search results received from the server 402 using user computers such as user computer A 404, for example, using a web-browser running on the computer. The server 402 generates user preference data from the actions of the users, for example, by tracking what search queries are submitted by users and what search results responsive to a query are selected by users. Users can also use user computers such as user computer A 404 to submit search queries to the server 402 and to view search results responsive to their queries, as well as query refinements for the queries.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving a search query, the search query associated with a user identifier;
receiving a ranked list of related search queries for the received search query, the related search queries being suggested alternate queries for the search query and ranked according to a first order;
accessing a profile tree associated with the user identifier and including a hierarchy of nodes, the hierarchy of nodes including a root node and a plurality of child nodes, each child node descending from the root node or another child node, the profile tree defining a plurality of levels, each level including child nodes that descend from the root node at a same depth, and each node of the profile tree representing a respective topic that is derived from search history data associated with the user identifier, and each node of the profile tree corresponding to at least one of a term or a phrase, and wherein the terms and phrases of the profile tree correspond to the nodes of the profile tree according to the respective topics to which the search terms and phrases belong;

for each of the related search queries:
identifying, by a computer, in the profile tree one or more nodes that match the related search query;
determining, by the computer, the respective levels of the one or more nodes that match the related search query;
determining, by the computer, a respective child count for each of the one or more nodes that match the related search query, the child count for each node being proportional to a number of child nodes descending directly from the node and a number of child nodes descending indirectly from the node; and
deriving, by the computer, a respective relevance score for the related search query based on the respective levels of the one or more nodes that match the related search query and the respective child counts of the one or more nodes that match the related search query, wherein the relevance score is directly proportional to depths of the respective levels of the one or more nodes that match the related search query, and is inversely proportional to the respective child counts of the one or more nodes that match the related search query;

adjusting, by the computer, the rank of at least one of the related search queries in the list based on the respective relevance scores of the related search queries so that the search queries are ranked according to a second order different from the first order; and providing, by the computer, suggested query data to a client device associated with the user identifier, the suggested query data operable to cause the client device to present a plurality of top-ranked related search queries according to the second order.

2. The method of claim 1, wherein the ranked list of related search queries are based on search queries previously submitted by a plurality of users.

3. The method of claim 1, wherein the search terms and phrases are search terms and phrases previously entered by a user in association with the user identifier.

4. The method of claim 3, wherein the one or more nodes that match the related search query are the nodes that explicitly correspond to at least one search term of the related search query.

5. The method of claim 1, wherein the terms and phrases are terms and phrases extracted from result documents that have been previously selected by a user during search sessions associated with the user identifier.

6. The method of claim 1, wherein for each of the related search queries, the one or more nodes that match the related search query each represents a respective topical category that includes a concept represented by terms of the related search query.

7. A non-transitory computer-readable medium having instructions stored thereon, the instructions, when executed by one or more processors, cause the one or more processors to perform operations comprising:
receiving a search query, the search query associated with a user identifier;
receiving a ranked list of related search queries for the received search query, the related search queries being suggested alternate queries for the search query and ranked according to a first order;
accessing a profile tree associated with the user identifier and including a hierarchy of nodes, the hierarchy of nodes including a root node and a plurality of child nodes, each child node descending from the root node or another child node, the profile tree defining a plurality of levels, each level including child nodes that descend from the root node at a same depth, and each node of the profile tree representing a respective topic that is derived from search history data associated with the user identifier, and each node of the profile tree corresponding to at least one of a term or a phrase, and wherein the terms and phrases of the profile tree corresponds to the nodes of the profile tree according to the respective topics to which the search terms and phrases belong;

for each of the related search queries:
identifying in the profile tree one or more nodes that match the related search query;
determining the respective levels of the one or more nodes that match the related search query;
determining a respective child count for each of the one or more nodes that match the related search query, the child count for each node being proportional to a number of child nodes descending directly from the node and a number of child nodes descending indirectly from the node; and
deriving a respective relevance score for the related search query based on the respective levels of the one or more nodes that match the related search query and the respective child counts of the one or more nodes that match the related search query, wherein the relevance score is directly proportional to depths of the respective levels of the one or more nodes that match the related search query, and is inversely proportional to the respective child counts of the one or more nodes that match the related search query;

adjusting the rank of at least one of the related search queries in the list based on the respective relevance scores of the related search queries so that the search queries are ranked according to a second order different from the first order; and providing suggested query data to a client device associated with the user identifier, the suggested query data operable to cause the client device to present a plurality of top-ranked related search queries according to the second order.

8. The non-transitory computer-readable medium of claim 7, wherein the ranked list of related search queries are based on search queries previously submitted by a plurality of users.

9. The non-transitory computer-readable medium of claim 7, wherein the search terms and phrases are search terms and phrases previously entered by a user in association with the user identifier.

10. The non-transitory computer-readable medium of claim 9, wherein the one or more nodes that match the related search query are the nodes that explicitly correspond to at least one search term of the related search query.

11. The non-transitory computer-readable medium of claim 7, wherein the terms and phrases are terms and phrases extracted from result documents that have been previously selected by a user during search sessions associated with the user identifier.

12. The non-transitory computer-readable medium of claim 7, wherein for each of the related search queries, the one or more nodes that match the related search query each represents a respective topical category that includes a concept represented by terms of the related search query.

13. A system, comprising:
one or more processors; and
memory having instructions stored thereon, the instructions, when executed by one or more processors, comprising:
receiving a search query, the search query associated with a user identifier;
receiving a ranked list of related search queries for the received search query, the related search queries being suggested alternate queries for the search query and ranked according to a first order;
accessing a profile tree associated with the user identifier and including a hierarchy of nodes, the hierarchy of nodes including a root node and a plurality of child nodes, each child node descending from the root node or another child node, the profile tree defining a plurality of levels, each level including child nodes that descend from the root node at a same depth, and each node of the profile tree representing a respective topic that is derived from search history data associated with the user identifier, and each node of the profile tree corresponding to at least one of a term or a phrase, and wherein the terms and phrases of the profile tree correspond to the nodes of the profile tree according to the respective topics to which the search terms and phrases belong;
for each of the related search queries:
identifying in the profile tree one or more nodes that match the related search query;
determining the respective levels of the one or more nodes that match the related search query;
determining a respective child count for each of the one or more nodes that match the related search query, the child count for each node being proportional to a number of child nodes descending directly from the node and a number of child nodes descending indirectly from the node; and
deriving a respective relevance score for the related search query based on the respective levels of the one or more nodes that match the related search query and the respective child counts of the one or more nodes that match the related search query, wherein the relevance score is directly proportional to depths of the respective levels of the one or more nodes that match the related search query, and is inversely proportional to the respective child counts of the one or more nodes that match the related search query;
adjusting the rank of at least one of the related search queries in the list based on the respective relevance scores of the related search queries so that the search queries are ranked according to a second order different from the first order; and
providing suggested query data to a client device associated with the user identifier, the suggested query data operable to cause the client device to present a plurality of top-ranked related search queries according to the second order.

14. The system of claim 13, wherein the ranked list of related search queries are based on search queries previously submitted by a plurality of users.

15. The system of claim 13, wherein the search terms and phrases are search terms and phrases previously entered by a user in association with the user identifier.

16. The system of claim 15, wherein the one or more nodes that match the related search query are the nodes that explicitly corresponds to at least one search term of the related search query.

17. The system of claim 13, wherein the terms and phrases are terms and phrases extracted from result documents that have been previously selected by a user during search sessions associated with the user identifier.

18. The system of claim 13, wherein for each of the related search queries, the one or more nodes that match the related search query each represents a respective topical category that includes a concept represented by terms of the related search query.

* * * * *

UNITED STATES PATENT AND TRADEMARK OFFICE
CERTIFICATE OF CORRECTION

PATENT NO. : 8,316,019 B1
APPLICATION NO. : 12/822103
DATED : November 20, 2012
INVENTOR(S) : Alex Ainslie Page 1 of 1

It is certified that error appears in the above-identified patent and that said Letters Patent is hereby corrected as shown below:

In Claim 7, Line 16, Column 16, delete "corresponds" and insert -- correspond --, therefor.

Signed and Sealed this
Twelfth Day of February, 2013

Teresa Stanek Rea
*Acting Director of the United States Patent and Trademark Office*